April 23, 1935. E. V. DAUTEL 1,998,534
HUMIDITY AND TEMPERATURE CONTROL DEVICE
Filed Jan. 30, 1932  2 Sheets-Sheet 1
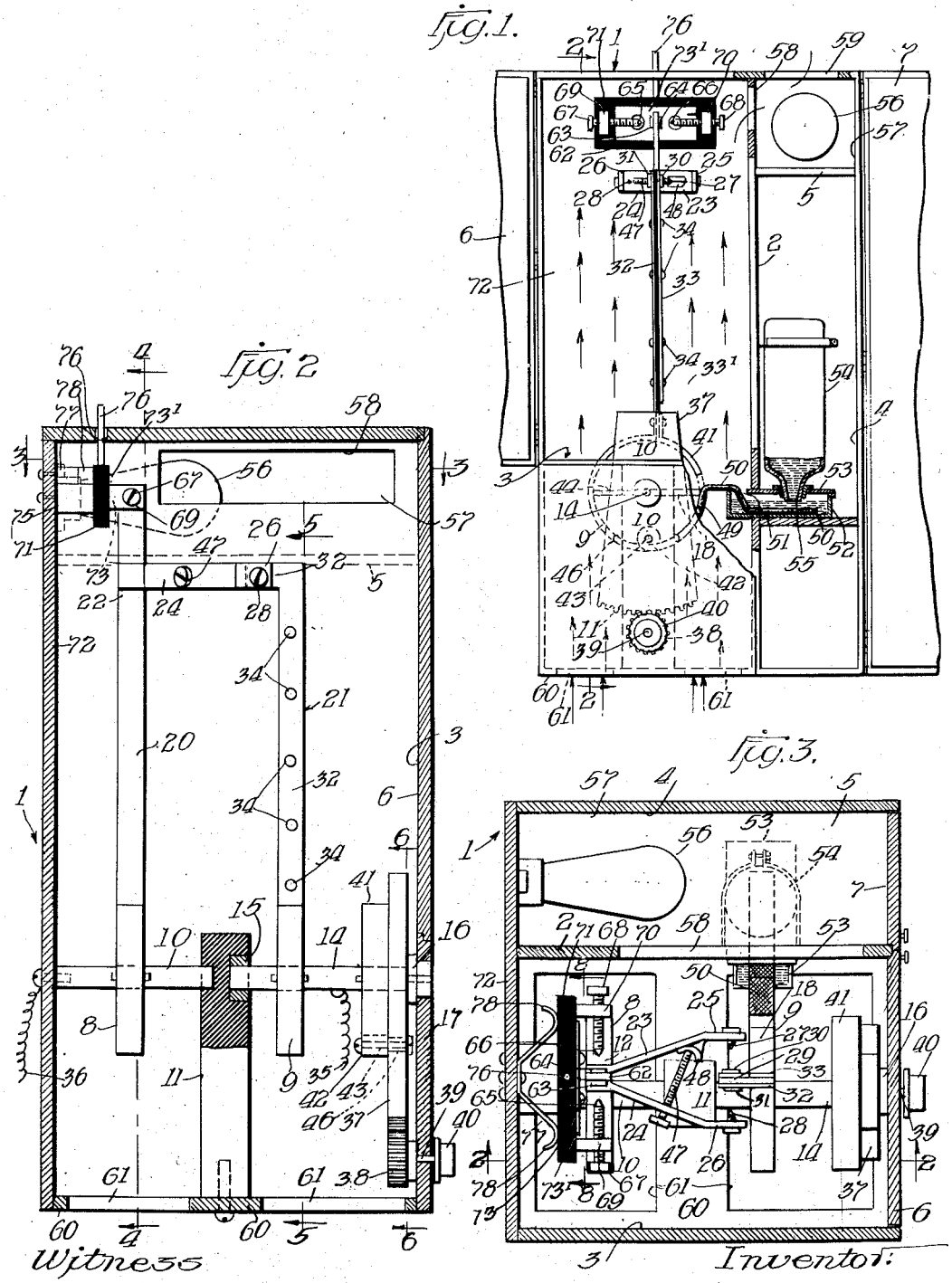
Witness
Harry P. L. White
Inventor:
Edward V. Dautel
By Edward Jay Wilson
atty April 23, 1935.                E. V. DAUTEL                1,998,534
HUMIDITY AND TEMPERATURE CONTROL DEVICE
Filed Jan. 30, 1932         2 Sheets-Sheet 2
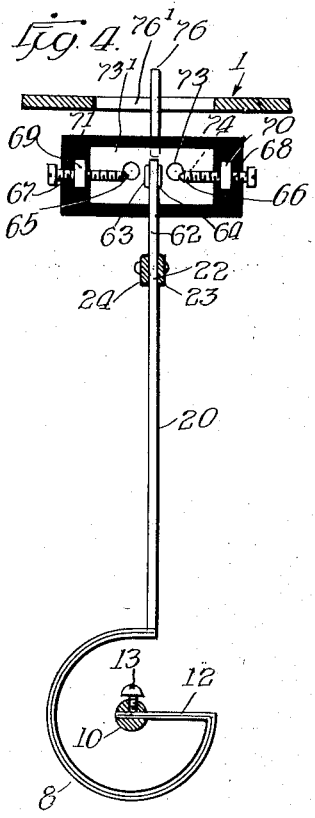
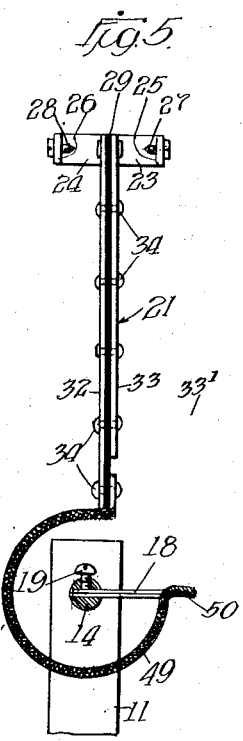
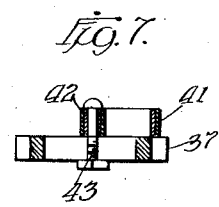
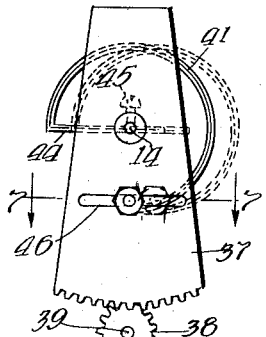
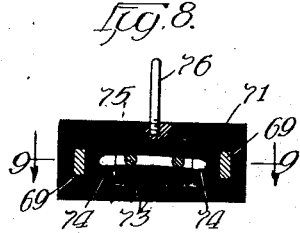
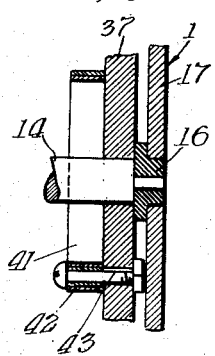
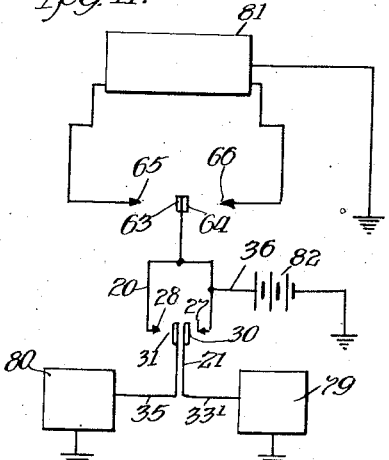
Witness
Harry R. L. White
Inventor
Edward V. Dautel
By Edward Fay Wilson
Atty Patented Apr. 23, 1935

1,998,534

UNITED STATES PATENT OFFICE 1,998,534

HUMIDITY AND TEMPERATURE CONTROL DEVICE

Edward V. Dautel, Chicago, Ill.

Application January 30, 1932, Serial No. 589,969

9 Claims. (Cl. 200—52)

This invention relates to an improved device for use in controlling the relative humidity of air especially in a relatively closed space such as a living apartment.

The object of the invention is to provide a device or instrument for this use which shall be dependable in its operation; which shall be of relatively simple and durable construction; which shall be capable in its simple form of controlling the relative humidity through the ordinary temperature fluctuations within a range which is practical; and which in another form shall be capable of maintaining a desired relative humidity throughout a more extended fluctuation of temperature.

The device makes use of the well known function of wet and dry bulb thermometers, which indicate the relative humidity, and by the combination of suitable thermostatic bars which simulate the wet and dry bulb thermometers suitable humidifying or dehumidifying apparatus is controlled through the medium of suitable electric devices.

An important feature of the invention is the combination with the dry thermostatic bar of means for controlling the temperature of the air, thus by the one device controlling both the temperature and the relative humidity.

Another important feature relates to simple means in conjunction with the wet thermostatic bar for automatically compensating for the change in temperature differences between the wet and dry bulb thermometers for changes in temperature.

For instance, a relative humidity of 50% at 70 degrees temperature would be indicated by a difference of temperature of 12 deg. Fahr. between the wet and dry temperatures, while at 50 deg. Fahr., a similar relative humidity of 50% would be shown by a difference of 14 deg. Fahr. and a greater temperature range would show a greater temperature difference. For this reason, unless some compensation or adjustment is made, the relative humidity would not be maintained constant but would vary to some extent with changes of temperature.

It is well known that when the relative humidity and temperature are both high and there is a relatively sudden drop in temperature, the relative humidity increases and if it reaches 100% then any further increase results in condensation on the walls, etc., with the well known undesirable results.

The device is useful in controlling the relative humidity in living rooms as well as in rooms or kilns used for the treatment of various products.

Preferably, the thermostatic bars are made in the form of helices for the purpose of producing a desirable range of movement of the free ends of same and yet keep the over-all dimensions within desirable limits.

To the accomplishment of the above noted and associated ends, the invention consists in the means hereinafter fully described and particularly pointed out in the appended claims, the accompanying drawings forming part of this specification, and the following description setting forth in detail one embodiment exemplifying the invention. Such disclosed structure, however, exemplifies but one of various applications of the principle of the invention.

The invention will be more readily understood by reference to said drawings, in which:—

Fig. 1 is a front elevation of the device, shown partly in vertical section and the cover being shown open for best disclosing the invention;

Fig. 2 is an enlarged, vertical section on the line 2—2 of Figs. 1 and 3;

Fig. 3 is a horizontal section on the line 3—3 of Fig. 2;

Figs. 4, 5 and 6 are fragmentary, vertical sections on the lines 4—4, 5—5 and 6—6, respectively, of Fig. 2;

Fig. 7 is a detail horizontal section on the line 7—7 of Fig. 6;

Fig. 8 is a detail vertical section on the line 8—8 of Fig. 3;

Fig. 9 is a fragmentary, horizontal section on the line 9—9 of Fig. 8;

Fig. 10 is a fragmentary, vertical section on the line 10—10 of Fig. 1; and

Fig. 11 is a diagram of the electric circuits.

In said drawings, 1 illustrates a suitable casing divided by a vertical partition 2 into two vertically extending compartments 3 and 4. The compartment 3 is the larger of the two and is adapted to contain the thermostatic bars and adjusting devices, and the smaller compartment 4 is adapted to contain means for supplying water to the wet bulb thermostatic bar. The compartment 4 is closed off at its upper end by a horizontal partition 5 to provide a small closed compartment at the top for containing an electric light bulb for use in causing a flow of air past the thermostatic bars in the compartment 3. Flat doors are provided for the two compartments, 6 for compartment 3 and 7 for compartment 4, to afford easy access to the devices therein.

The casing is adapted to be installed at a suitable height on the wall of the compartment in which it is desired to use it.

The instrument is in a sense a temperature and relative humidity indicator but is intended to close electric circuits to control or operate suitable temperature and humidity changing devices not shown except diagrammatically in the electric circuit diagram.

The humidity indicating mechanism consists of a dry thermostatic bar 8 and a wet thermostatic bar 9, and means by which their indications of temperature can be adjusted and used for changing the relative humidity of the atmosphere and also for changing the temperature of the air. Both these bars 8 and 9 are bi-metal bars and are each preferably, as shown, curved in the form of a helix or circle.

The dry bar 8 is mounted rigidly at one end on a fixed horizontal shaft 10 carried at one end by the casing 1, and at the other end by a fixed post 11 of insulation material such as bakelite. For this purpose, one end 12 of the bar 8 is bent inwardly and is secured in an opening in the shaft 10 by a set screw 13.

The bar 9 is likewise mounted on a horizontal shaft 14 arranged in axial alignment with the shaft 10 but insulated from the shaft 10 and from the casing. For this purpose, one end of the shaft 14 is mounted in the insulation post 11, a metal bushing 15 being provided in which the shaft can rotate, and at its opposite end in an insulation bushing or bearing 16 secured in the front wall 17 of the casing 1. The bar 9 likewise has an end 18 bent inwardly and adapted to be received in an opening in the shaft 14 and is secured therein by a set screw 19.

The bar 9 is thus rigidly mounted on the shaft 14, but as the shaft is not rigidly secured against rotation, the bar and shaft can be rotated together in a vertical plane around the axis of the shaft as a center.

At the opposite ends of the bars 8 and 9, they are each provided with a rigidly connected rigid arm arranged to extend up in the compartment 3 one in front of the other.

The helix 8 has the arm 20 and the helix 9 the arm 21. Near the upper or free end 22 of the arm 20 it is provided with two similar forwardly extending horizontal arms 23 and 24 which are spread apart at their free ends 25 and 26 with contact points 27 and 28, respectively. These arms 23 and 24 straddle or receive between them the upper free end 29 of the other arm 21. The free end 29 of the arm 21 is provided with contact plates 30 and 31 opposed to the contact points 27 and 28, respectively, and insulated from each other.

The bi-metal strip of which the wet helix 9 is made, is bent up to form one side 32 of the arm 21, and the other side is formed by a metal strip 33 secured to the strip 32 by suitable means, such as rivets 34, the two strips being arranged upon opposite sides of a strip of suitable insulating material, and the strips 32 and 33 so mounted that they are insulated from each other. The contact plates 30 and 31 are carried, respectively, by the strips 33 and 32. A circuit wire 33' is secured to the strip 33 and in circuit with the contact plate 30, and a second circuit wire 35 is secured to the shaft 14 and in circuit with the contact plate 31.

The arm 20 of the thermostatic bar 8 is formed by an extension of the strip of which the helix 8 is made, and as the shaft 10, upon which it is grounded to the casing 1, the connection to the current supply may be made by connection to the casing, as shown at 36.

The shaft 14 upon which the wet bulb arm 9 is mounted is controlled as to its relation to the arm 8 by means of a segmental gear 37 secured to the shaft 14 and a co-operating pinion 38 rotatably mounted in the front wall of the case on a shaft 39 which projects through the front wall 17 and is provided on its outer end with a button 40 by which it can be rotated.

While the gear 37 could be secured directly to the shaft 14 to rotate same, I prefer to provide a device between the gear and the shaft for the purpose of compensating for the change in the relative temperature indication of the wet and dry thermostatic bars at different temperatures. This compensating device consists of a third bi-metal helix 41 which is like the others except that ordinarily it is not provided with arms on its free end 42 but its free end is clamped to the gear 37 by a bolt 43.

The opposite end 44 of the helix is bent inwardly and extends through a slot in the shaft 14. It is held in its adjusted position in the shaft by a set screw 45.

The bar 41 being clamped securely at one end to the shaft 14 and at the other to the gear 37, and the gear being held against rotation by the pinion 38, any change in the bar 41 will tend to rotate the shaft 14 and with it the thermostatic bar 9.

For the purpose of adjusting the bar 41 to accurately compensate for the changes in temperature spoken of, the gear 37 is provided with a slot 46 parallel with the bent-in end 44 of the bar and by loosening the bolt 43 and the set screw 45, the bar 41 can be adjusted to the right or left, as may be, to obtain the results desired.

For the purpose of adjusting the distance apart of the contact points 27 and 28 of the bar 8, an adjusting screw 47 is provided, mounted in a threaded opening in the arm 24 and its point engaging the opposite arm 33. By forcing the screw 47 in the arms 23 and 24 are spread, thus forcing the points 27 and 28 apart and by backing the screw 47 out, the arms, being resilient, automatically approach each other.

For the purpose of providing a firm bearing for the point of the screw 47, the arm 23 is provided with a V-shaped trough 48 to receive same.

The wet bulb bar 9 is provided with a fibrous wick-like cover 49 and the free end 50 extends through an opening 51 in the partition 2 into the compartment 4. To supply moisture to the wick 49, a small pan 52 is provided in the compartment 4 and also extending through the opening 51 into the compartment 3. The top of the pan is open in the compartment 3 to permit the wick to enter the pan. In the compartment 4, the pan has a fixed cover 53 upon which is mounted a bottle 54 with its mouth 55 seated in the cover 53 and adapted to supply water to the pan 52 as the water is withdrawn by the wick 49. The door 7 permits this part of the device to be readily taken care of.

Usually a device of this character, in order to properly indicate the room temperature, should be broungh into contact with the air of more than just one fixed position in the room. For this purpose, some means is provided for causing the air to flow through the casing. In the form of apparatus shown, this means consists of an electric lamp 56 arranged in the small compartment 57 above the partition 5. This compartment communicates with the compartment 3 in which the thermostatic bars are mounted by an opening 58 in the upper end of the partition 2, and the compartment 57 is open at its top, as shown at 59. Likewise, the bottom 60 of the compartment is provided with openings 61 so that when the lamp 56 is lit the heat from the lamp sets up a vertical current of air through the compartment 3.

In addition to the contact points 27 and 28 on the bar 8 for co-operation with the wet bulb bar for controlling the relative humidity of the air in the room, the bar 8 which registers the dry temperature is used as a means for controlling the temperature of the air in the room. For this purpose the arm 20 of the bar 8 extends above the arms 23 and 24, as shown at 62, and is provided at its upper free end with contact plates 63 and 64, one on each side.

For co-operation with these contact plates, respectively, two adjustable contact points 65 and 66 are provided. These points 65 and 66 are on the points of horizontally arranged screws 67 and 68, respectively, which, in turn, are adjustably mounted in posts 69 and 70, respectively, rigidly projecting from a block 71 of insulation material.

This block is adjustably mounted on the rear wall 72 of the case by means of screws 73 which pass through a slot 74 in the block 71 and engage in a block 75 fixed to the wall 72. The screws 73 hold a flat plate 73' against the front of the block 71. This construction allows the points 64 and 65 to be adjusted together transversely of the bar 20 for changing the temperature regulation as for night and day, as desired. For this purpose, a rigid vertically extending arm 76 is provided on the block 71 which extends up through a slot 76' in the top wall of the case. To yieldingly hold the block 71 in its adjusted position, a friction producing spring 77 is provided secured to the back wall 72 of the case behind the block 71 and having curved arms 78 yieldingly contacting with the back of the block 71.

As the arm 20 swings on the axis of the shaft 10 as a center, the slot is made on the arc of a circle struck from the axis of the shaft as a center so that the contact points 64 and 65 will properly follow the contact plates 62 and 63.

There are two functions of the mechanism, one to control the humidity of the air of the room, and the other to control the temperature.

It is the function of the wet and dry bulb bars 8 and 9 to control the relative humidity and it is also the function of the dry bar 8 to control the temperature.

As described, the circuit wire 36 which is connected to the case supplying current to the dry bar 8 and through the contact plates of this bar current passes to the various devices for changing the relative humidity and the temperature.

Before illustrating the operation of the device, I will explain the electrical diagram, Fig. 11.

In said Fig. 11, 79 illustrates some suitable apparatus for increasing the humidity of the air, 80 a similar mechanism adapted to decrease the humidity, while 81 illustrates means for increasing or decreasing the temperature. It is presumed that these several devices are arranged to be controlled by current supplied through the several circuit closing points.

The source of current 82 is connected to the case of the device by the wire 36, as explained, and is therefore supplied to the thermostatic arm 20. Through the several contact points, the current may be supplied to the humidifier 79 through the contact point 27 and the wire 34 attached to the plate 33 of the thermostatic arm 21 or to the dehumidifier 80 through the contact point 28, the plate 32 of the arm 21 and the wire 35 connected to the shaft 14. Also, the temperature control device 81 is, in turn, controlled through the contact points 65 or 66 to increase or decrease the temperature as the case may be. The source of supply 82 and the several operating devices 79, 80 and 81 may be connected to a common return or to the ground as may be desirable.

In the operation of the device, a movement or swing of the dry helix due to a change in room temperature will be followed by a corresponding movement of the wet helix except that the latter movement will correspond to the wet bulb temperature. By adjusting the position of the wet helix contacts between the dry helix contacts the desired temperature difference between the two helices corresponding to the desired degree of humidity can be obtained.

The operation of the instrument is as follows:

The room temperature being maintained as desired, a humidity of less than the desired degree will cause a greater cooling of the wet helix than normal, causing 30 to make contact with 27 which will close the circuit through 30 and proper circuit wires to suitable apparatus probably including a suitable relay (not shown) and which controls the apparatus 79 for increasing the humidity of the room. This contact is maintained until such time that the wet helix shall reach a temperature corresponding to the wet bulb temperature of the desired relative humidity.

Should the humidity rise above a predetermined limit, due either to an increased evaporation of water into the air or a fall in the dry bulb temperature, the relative movements of the two helices would bring the contact point 28 into contact with the plate 31, on the wet bulb helix and through a suitable circuit which would thus be closed, set the dehumidifier 80 into operation.

The operation of the dry bulb helix to control the temperature is similar to the usual thermostatic control of heating devices, that is. through the closing of suitable circuits and devices by the contacts 62 and 64 or 63 and 65, heat will be supplied or cut off, as the case may be.

An important feature of this instrument is the fact that the humidity control is maintained whatever the room temperature or its fluctuations.

For a drop in temperature, the instrument operates to effect a corresponding drop in humidity and likewise for a rise in temperature, an increase in humidity is effected.

The above operation is sufficient for many installations and the instrument would operate as described if the extra helix 18 were not a thermostatic bar. But for many installations, an adjustment to compensate for the fact that the same relative humidity does not correspond with the same difference between wet and dry bulb temperatures throughout the range of temperatures but gradually lessens as the temperatures drop.

For instance, if the desired conditions were 70 deg. Fahr. and 50% relative humidity, this condition would hold until a change in temperature. A temperature drop to 50 deg. Fahr. with the same wet-dry-bulb temperature relation would correspond to a relative humidity of 38% and a temperature increase to 80 deg. Fahr. would correspond to a relative humidity of 56% for the same wet-dry-bulb temperature difference. The relative humidity would be constantly under control and a return to normal temperature would be accompanied by readjustment of conditions by humidification or dehumidification, whichever might be necessary to bring the relative humidity to the 50% desired at 70 deg. Fahr.

In some instances it is desirable to prevent the changes in relative humidity due to changes of temperature which was noted above. The extra helix 18 is for this purpose. The operation of this compensator is as follows: This helix is set in the shaft and the gear so that the effective part of the helix, which is of course subject to the room temperature, will be effective on the shaft 14 to swing the arm 20 enough to compensate for the change in the normal difference of temperature between the wet bulb and the dry bulb indications.

For instance, presume that one temperature desired is 70 deg. Fahr. and relative humidity 50%, another temperature desired is 60 deg. Fahr. and 50% relative humidity. The wet-dry temperature difference at 70 deg. Fahr. is 12 deg. Fahr. while at 60 deg. Fahr. it is 14 deg. Fahr. The third helix operates to compensate for this 2 deg. change and the instrument operates to maintain the relative humidity at 50% throughout the range.

It will be readily understood that many modifications of the invention will readily suggest themselves to one skilled in the art and consequently the invention is not limited or confined to the specific details of construction or arrangement or combinations of devices or parts herein shown and described.

I claim:

1. In a mechanism of the kind described, two cooperating thermostatic bars, simulating, respectively, a wet and dry bulb thermometer, each rigidly mounted at one end, the opposite ends free to respond to changes in the temperature of the surrounding atmosphere, the free ends of the bars provided with cooperating electric circuit-closing contacts, one of said bars being adjustable in relation to the other for changing the relative humidity of the surrounding atmosphere, means associated with said bars, including the co-operating electric circuit contacts on the free ends of said bars for effecting the relative humidity of the surrounding atmosphere, and temperature responsive means arranged and adapted to automatically adjust the position of the wet bar to compensate for variations in relative humidity due to changes in temperature of the surrounding atmosphere.

2. In a mechanism of the kind described, two cooperating thermostatic bars, simulating, respectively, a wet and dry bulb thermometer, each rigidly mounted at one end, the opposite ends free to respond to changes in the temperature of the surrounding atmosphere, the free ends of the bars provided with cooperating electric circuit-closing contacts, one of said bars being adjustable in relation to the other for changing the relative humidity of the surrounding atmosphere, means associated with said bars, including the co-operating electric circuit contacts on the free ends of said bars for effecting the relative humidity of the surrounding atmosphere, the thermostatic bars being in the form of helices mounted at their inner ends, and a third thermostatic helix arranged and adapted to automatically adjust the position of the wet bar to compensate for variations in relative humidity due to changes of temperature of the surrounding atmosphere.

3. In a mechanism of the kind described, two cooperating thermostatic bars, simulating, respectively, a wet and dry bulb thermometer, each rigidly mounted at one end, the opposite ends free to respond to changes in the temperature of the surrounding atmosphere, the free ends of the bars provided with cooperating electric circuit-closing contacts, one of said bars being adjustable in relation to the other for changing the relative humidity of the surrounding atmosphere, means associated with said arms, including the co-operating electric circuit contacts on the free ends of said bars for effecting the relative humidity of the surrounding atmosphere, the bar which simulates a wet bulb thermometer being in the form of a helix, the inner end of the helix rigidly mounted on a shaft, a curved thermostatic bar rotatably connecting the shaft to a relatively fixed element and adapted to adjust the wet bar to compensate for the variations in relative humidity due to changes in temperature.

4. In a device of the kind described, a thermostatic bar, means for keeping the bar moist to cause it to simulate a wet bulb thermometer, the bar being in the form of a helix, a shaft upon which its inner end is rotatably mounted, an arm rotatably mounted on the shaft, a curved thermostatic bar keying the arm to the shaft, and means for holding the arm in relatively adjusted positions as and for the purpose specified.

5. In a device of the kind described, a dry thermostatic bar rigidly mounted at one end, a co-operating wet thermostatic bar rigidly mounted at one end on a rotatable shaft, a quadrant on said shaft, means keying the quadrant to the shaft, and a pinion meshing with the quadrant for adjusting same, the keying means comprising a thermostatic bar the wet and dry thermostatic bars being arranged and adapted for co-operatively opening and closing electric circuits for effecting changes in the relative humidity of the surrounding atmosphere.

6. In a device of the kind described, a dry thermostatic bar rigidly mounted at one end, a cooperating wet thermostatic bar rigidly mounted at one end on a rotatable shaft, a quadrant on said shaft, means keying the quadrant to the shaft, and a pinion meshing with the quadrant for adjusting same, the keying means comprising a thermostatic bar adjustably secured at its ends to said quadrant and to its shaft the wet and dry thermostatic bars being arranged and adapted for co-operatively opening and closing electric circuits for effecting changes in the relative humidity of the surrounding atmosphere.

7. In a device of the kind described, a dry thermostatic bar rigidly mounted at one end, a co-operating wet thermostatic bar rigidly mounted at one end on a rotatable shaft, a quadrant on said shaft, means keying the quadrant to the shaft, and a pinion meshing with the quadrant for adjusting same, the keying means being responsive to changes of temperature and arranged and adapted to compensate for differences in humidity due solely to changes of temperature the wet and dry thermostatic bars being arranged and adapted for co-operatively opening and closing electric circuits for effecting changes in the relative humidity of the surrounding atmosphere.

8. In a device of the kind described, a dry thermostatic bar rigidly mounted at one end, a co-operating wet thermostatic bar rigidly mounted at one end on a rotatable shaft, a quadrant on said shaft, means keying the quadrant to the haft, and a pinion meshing with the quadrant or adjusting same, the keying means being a thermostatic bar in the form of a helix and adapted to rotate said shaft to compensate for changes in humidity due to changes in temperature the wet and dry thermostatic bars being arranged and adapted for co-operatively opening and closing electric circuits for effecting changes in the relative humidity of the surrounding atmosphere.

9. In a mechanism of the kind described, two co-operating thermo-responsive elements, the elements simulating respectively a wet and a dry bulb thermometer, means controlled by said elements for effecting the humidity of the surrounding atmosphere, one of said elements being adjustable relatively to the other for changing the action of said elements on said controlled means for changing the relative humidity of the surrounding atmosphere, and a third thermo-responsive element arranged and adapted to automatically adjust the relative position of the relatively adjustable element to compensate for variations in relative humidity due to changes in temperature of the surrounding atmosphere.

EDWARD V. DAUTEL.